United States Patent [19]
Tatsumi

[11] Patent Number: 5,272,521
[45] Date of Patent: Dec. 21, 1993

[54] WHITE BALANCE CONTROL BASED UPON NEGATIVE OR POSITIVE MODE SELECTION

[75] Inventor: Shingo Tatsumi, Kawasaki, Japan
[73] Assignee: Canon Kabushiki Kaisha, Tokyo, Japan
[21] Appl. No.: 790,784
[22] Filed: Nov. 12, 1991
[30] Foreign Application Priority Data
Nov. 14, 1990 [JP] Japan ................ 2-308067
[51] Int. Cl.$^5$ .................................. H04N 9/73
[52] U.S. Cl. ........................ 358/29; 358/41
[58] Field of Search ............... 358/29 C, 29, 41
[56] References Cited
U.S. PATENT DOCUMENTS
4,608,595 8/1986 Nakayama et al. ............ 358/29 C FOREIGN PATENT DOCUMENTS
2-298190 12/1990 Japan .
2-298192 12/1990 Japan .

Primary Examiner—Mark R. Powell
Attorney, Agent, or Firm—Morgan & Finnegan

[57] ABSTRACT

There is provided a video camera which, when a white balance of a plurality of color signals is controlled according to color temperature information, the plurality of color signals are selectively reversed depending on a negative mode or a positive mode, and a control characteristic is changed between first and second control characteristics having different white balance control ranges, so that the white balance can be automatically controlled in either the negative or positive mode.

12 Claims, 3 Drawing Sheets

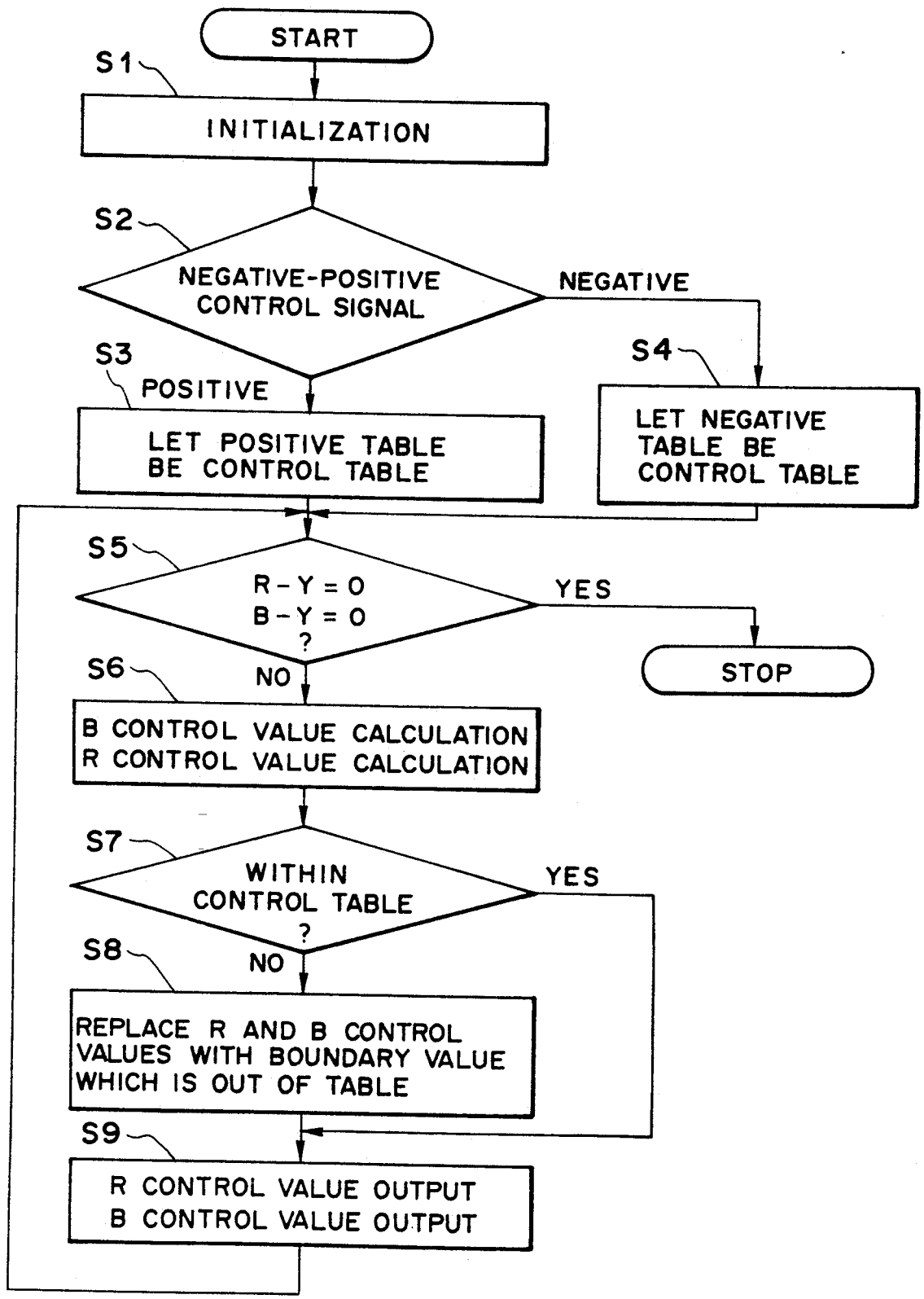

5,272,521

WHITE BALANCE CONTROL BASED UPON NEGATIVE OR POSITIVE MODE SELECTION

BACKGROUND OF THE INVENTION

1. Field of the Invention

The present invention relates to a video camera and, more particularly, to a video camera having a negative-positive reversal function.

2. Related Background Art

A video camera having an electronic image pickup element such as a commercial movie camera, an electronic still camera, a TV broadcast camera, or the like is generally equipped with a white balance control circuit for feedback-controlling the amplitudes of R and B components in an image signal of a photographed image. A video camera having a negative-positive reversal function for outputting a negative or positive image as a positive or negative image has also been proposed.

However, as described above, a conventional video camera having both the white balance control function and the negative-positive reversal function performs white-balance control of a photographed image signal, and then performs negative-positive reversal processing. Thus, when a video camera of this type photographs a negative image while performing white-balance control, and outputs a positive image by negative-positive reversal processing of the negative image, the white balance of the positive-output video image is often lost due to the following reason. The film base of a negative film is colored in a predetermined color. As a result, the color of the film base is added to white-balance control as an offset value, and information associated with a color temperature of a light source is reversed and recorded on the negative film. Therefore, when the white-balance control function, which prospects a normal positive image, is directly used, a proper white balance cannot be obtained for a positive output upon a photographing operation of a negative film.

For this reason, in a conventional video camera of this type, when a positive output is obtained upon a photographing operation of a negative film, the automatic white-balance control function is normally disabled.

SUMMARY OF THE INVENTION

It is an object of the present invention to provide a video camera having a negative-positive reversal function, which can always perform automatic white balance control under the above-mentioned situation.

It is another object of the present invention to provide a video camera, which can satisfactorily perform automatic white-balance control upon a photographing operation of a negative film.

In order to achieve the above objects, according to one aspect of the present invention, there is provided a video camera comprising:

(a) image pickup means for photoelectrically converting an optical image to form a plurality of color signals;

(b) generation means for generating color temperature information;

(c) white balance control means for controlling a white balance of the plurality of color signals according to the color temperature information, the white balance control means being able to be arranged to change a control characteristic between first and second control characteristics having different white balance control ranges;

(d) reverse means for selectively reversing the plurality of color signals; and (e) interlocking means for interlocking the reverse means and a changing operation of the control characteristic of the white balance control means.

Other objects and features of the present invention will become apparent from the following detailed description of the preferred embodiments taken in conjunction with the accompanying drawings.

BRIEF DESCRIPTION OF THE DRAWINGS

FIG. 4 is a flow chart for explaining the operation of the MPU shown in FIG. 1.

DETAILED DESCRIPTION OF THE PREFERRED EMBODIMENTS

An embodiment of the present invention will be described in detail below with reference to the accompanying drawings.

Figure 1:
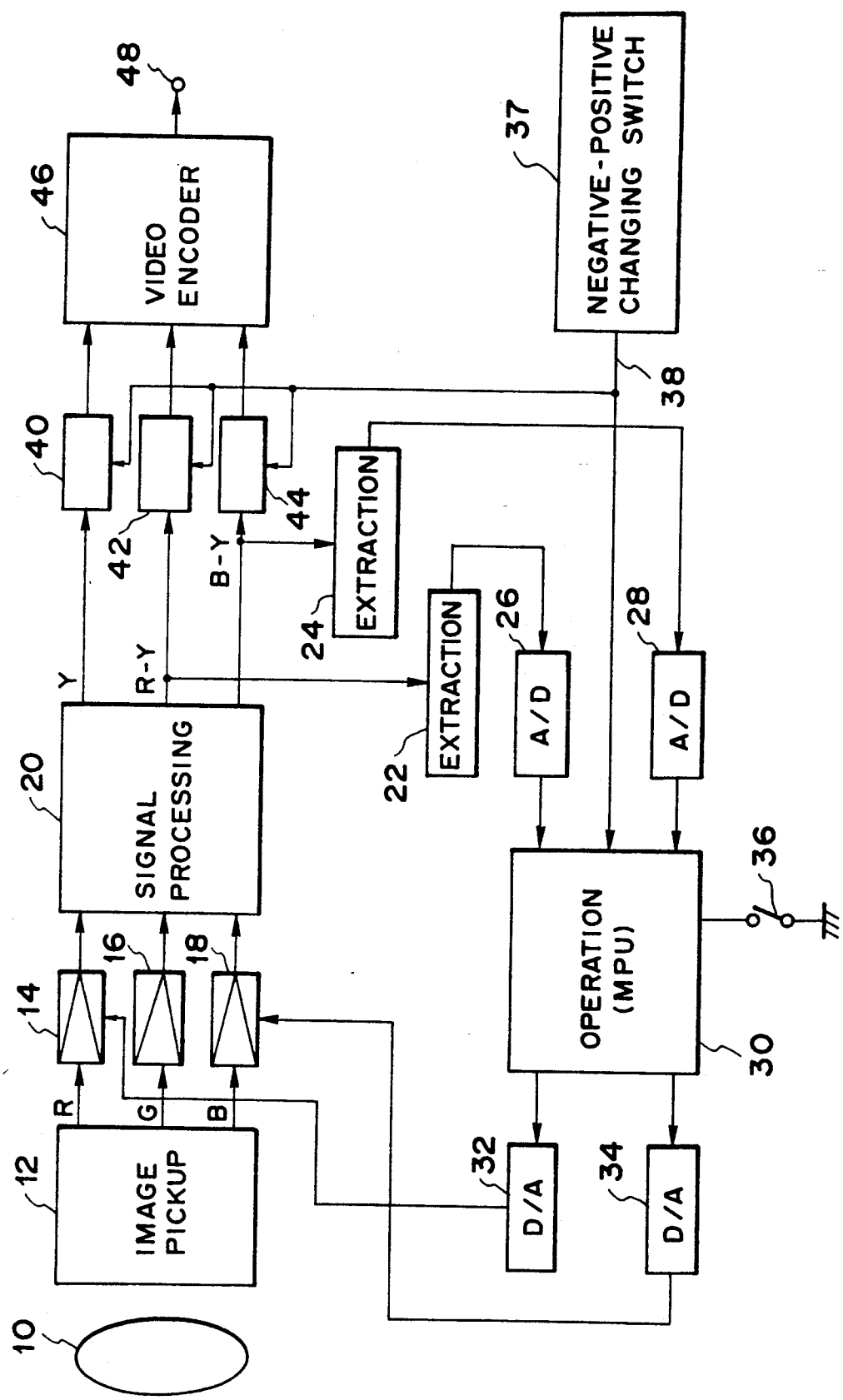
FIG. 1 is a block diagram showing an arrangement of a video camera according to an embodiment of the present invention.

FIG. 1 is a block diagram showing an arrangement of a video camera according to an embodiment of the present invention. The video camera shown in FIG. 1 includes a photographing lens 10, an image pickup element 12 for photoelectrically converting an object image formed by the photographing lens 10, and outputting R, G, and B signals, and amplifiers 14, 16, and 18 for respectively amplifying R, G, and B outputs from the image pickup element 12. The amplifiers 14 and 16 are variable-gain amplifiers whose gains can be controlled by a control signal. A signal processing circuit 20 performs predetermined image signal processing, and converts R, G, and B signals into a luminance signal Y, and color difference signals R-Y and B-Y.

Information extraction circuits 22 and 24 extract information for white-balance control from the color difference signals R-Y and B-Y output from the signal processing circuit 20. When a white balance is controlled by, e.g., average values of color difference signals, the information extraction circuits 22 and 24 comprise average value detection circuits or low-pass filters. The video camera also includes A/D converters 26 and 28 for converting analog outputs from the information extraction circuits 22 and 24 into digital signals, and an operation circuit (microcomputer MPU) 30 for obtaining gain control values of the amplifiers 14 and 18 for the R and B signals by looking up a control table (to be described later). As will be described in detail later, in this embodiment, the operation circuit 30 comprises at least two tables, i.e., negative and positive tables, and a table to be used is determined by a negative-positive control signal 38 (to be described later).

D/A converters 32 and 34 respectively convert R and B control values determined by the operation circuit 30 into analog signals. The gains of the amplifiers 14 and 18 are controlled by the outputs from the D/A converters 32 and 34. A switch 36 is used for instructing an active or inactive mode of the operation circuit 30. A negative-positive changing switch 37 is used for changing the operation mode of the video camera between a negative mode and a positive mode.

The video camera further includes negative-positive changing circuits 40, 42, and 44. When the negative-positive control signal 38 designates the positive mode upon a manual operation of the negative-positive changing switch 37, the circuits 40, 42, and 44 directly output the Y, R-Y, and B-Y outputs from the signal processing circuit 20. On the other hand, when the negative-positive control signal designates the negative mode, the circuits 40, 42, and 44 reverse and output the Y, R-Y, and B-Y outputs.

Moreover, the video camera includes a video encoder 46 for forming a standard video signal on the basis of the outputs from the negative-positive changing circuits 40, 42, and 44, and a video output terminal 48.

Figure 2:
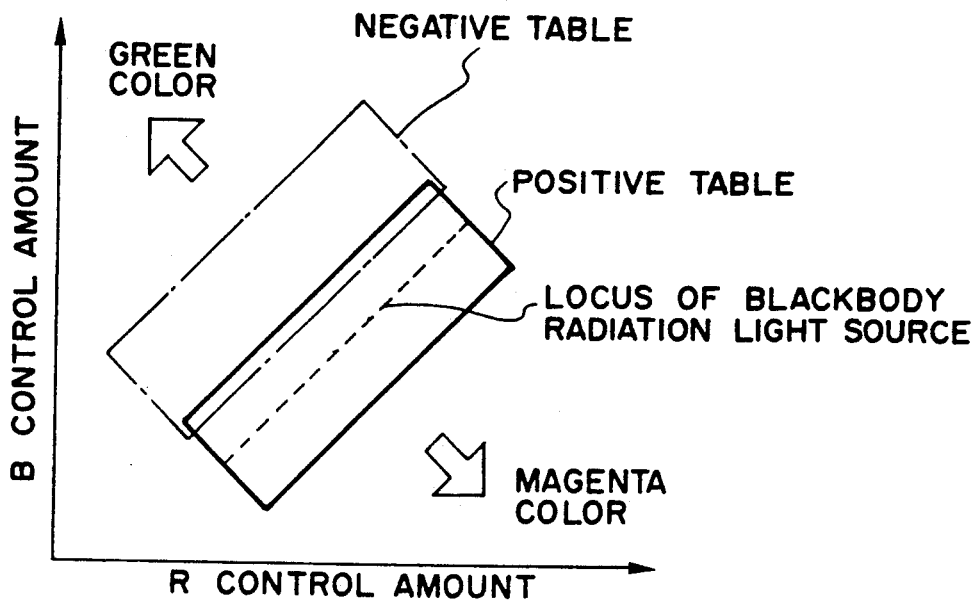
FIG. 2 is a graph for explaining an example of a control value range using a control table allocated in an MPU shown in FIG. 1.

The tables in the operation circuit 30 will be described below. FIG. 2 shows an example of the tables. An R control amount for controlling the gain of the amplifier 14 is plotted along the abscissa, and a B control amount for controlling the gain of the amplifier 18 is plotted along the ordinate. A portion surrounded by solid lines represents a range of the R and B control amounts, which can be taken by a table (positive table) used in the positive mode for a positive image. A portion surrounded by alternate long and short dashed lines represents a range of the R and B control amounts, which can be taken by a table (negative table) used in the negative mode for a negative image. A broken line in the positive table represents a locus of a change in R and B control amounts for a black body radiation light source. The reason why the positive table has a margin for the locus of the black body radiation light source is to obtain a white balance for an artificial light source such as a fluorescent lamp. The reason why the negative table is shifted in an upper left direction with respect to the positive table is that the color of a negative film base is expressed in a magenta system, and the negative table is shifted in the upper left direction to correct magenta to green.

Figure 3:
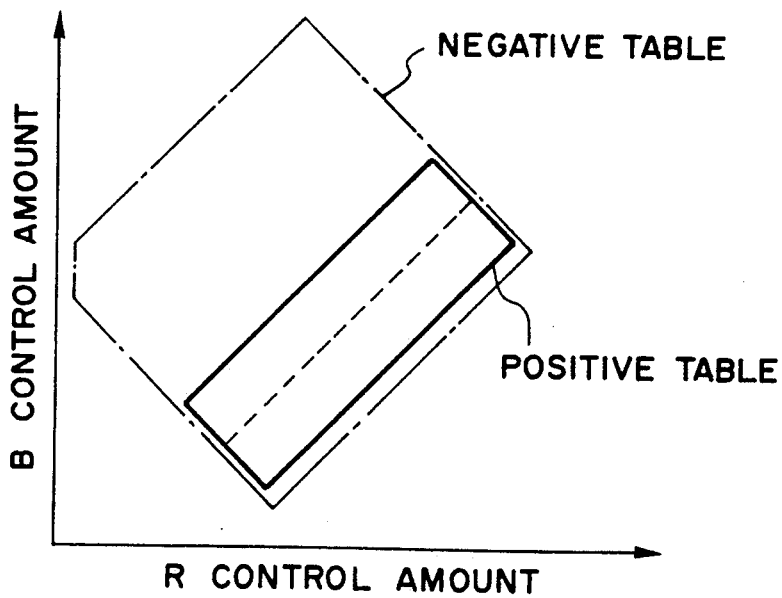
FIG. 3 is a graph for explaining another example of a control value range using a control table allocated in the MPU shown in FIG. 1.

FIG. 3 shows another example of the negative and positive tables. Like in FIG. 2, a portion surrounded by solid lines represents a range of the R and B control amounts, which can be taken by the positive table, and a portion surrounded by alternate long and short dashed lines represents a range of the R and B control amounts, which can be taken by the negative table. In FIG. 3, the range of the negative table is extended to include the range of the positive table. In this manner, when a normal image other than a negative film is photographed, and is output after negative-positive reversal processing, a good white balance can be maintained.

The basic operation of FIG. 1 will be briefly described below. The image pickup element 12 converts an object image formed by the photographing lens 10 into electrical signals, and outputs R, G, and B signals. The R, G, and B signals output from the image pickup element 12 are amplified by the amplifiers 14, 16, and 18, respectively, and the amplified signals are converted into a luminance signal Y, and color difference signals R-Y and B-Y by the signal processing circuit 20.

The information extraction circuits 22 and 24 extract color balance information of an image signal from the color difference signals R-Y and B-Y output from the signal processing circuit 20. The extraction results (e.g., frame average values of the signals R-Y and B-Y) are converted into digital signals by the A/D converters 26 and 28, and the digital signals are input to the operation circuit 30. As will be described in detail later, the operation circuit 30 obtains the R and B control values for making zero or almost zero the outputs from the A/D converters 26 and 28 using a table selected according to the negative-positive control signal 38 as a white balance control table, and outputs the obtained values to the D/A converters 32 and 34. If corresponding R and B control amounts cannot be found within the range of the control table, the closest boundary values outside the table are employed The obtained R and B control amounts are converted into analog signals by the D/A converters 32 and 34, and control the gains of the amplifiers 14 and 18, respectively.

In this manner, the output signals from the signal processing circuit 20 can become properly white-balanced signals. The negative-positive changing circuits 40, 42, and 44 output the outputs from the signal processing circuit 20 while allowing the outputs to go therethrough or reversing the outputs. The video encoder 46 forms a standard video signal on the basis of the outputs from the negative-positive changing circuits 40, 42, and 44, and outputs it to the output terminal 48.

The operation of the operation circuit 30 will be described below with reference to the flow chart shown in FIG. 4. When the switch 36 is closed, the operation circuit 30 is enabled, and initializes its internal circuit (S1). The operation circuit 30 then checks the negative-positive control signal 38 (S2). If the positive mode is designated, the operation circuit 30 determines the positive table as a control table used in a white balance control operation (S3). On the other hand, if the negative mode is designated, the operation circuit 30 determines the negative table as a control table (S4). If the extraction results of both R-Y and B-Y signals input from the A/D converters 26 and 28 are zero (S5), white balance control is ended; otherwise, the operation circuit 30 calculates R and B control amounts (S6). If the calculation results fall outside the control table (S7), the operation circuit 30 replaces the R and B control amounts with boundary values outside the table (S8), and outputs the R and B control amounts (S9). The operation circuit 30 repeats steps S5 to S9 until the extraction results of both the R-Y and B-Y signals become zero.

As can be easily understood from the above description, according to the present invention, when a negative film image is to be positive-output, a good white balance can be obtained by the simple arrangement.

What is claimed is:
1. A video camera comprising:
(a) image pickup means for photoelectrically converting an optical image to form a plurality of color signals;
(b) generation means for generating color temperature information;
(c) white balance control means for controlling a white balance of the plurality of color signals according to the color temperature information, said white balance control means being able to be arranged to change a control characteristic between first and second control characteristics having different whit balance control ranges;
(d) reverse means for selectively reversing the plurality of color signals; and
(e) interlocking means for interlocking said reverse means and a changing operation of the control characteristic of said white balance control means.

2. A video camera according to claim 1, wherein said generation means generates the color temperature information using pieces of color information associated with the plurality of color signals.

3. A video camera according to claim 2, wherein said generation means includes an extraction circuit for extracting average levels of the plurality of color signals.

4. A video camera according to claim 3, wherein said extraction circuit extracts the plurality of color signals before the color signals are reversed by said reverse means.

5. A video camera according to claim 1, wherein said white balance control means includes gain control means for adjusting relative gains of the plurality of color signals.

6. A video camera comprising:
(a) image pickup means for photographically converting an optical image to form a plurality of color signals;
(b) generation means for generating color temperature information;
(c) white balance control means for controlling a white balance of the plurality of color signals according to the color temperature information, said white balance control means being able to be arranged to change a control characteristic between first and second control characteristics having different white balance control ranges;
(d) reverse means for selectively reversing the plurality of color signals; and
(e) interlocking means for interlocking said reverse means and a changing operation of the control characteristic of said white balance control means, wherein said white balance control means include gain control means for adjusting relative gains of the plurality of color signals, and wherein said white balance control means has first and second control tables for defining gain control ranges of the plurality of color signals, and selectively uses said first and second control tables to change the control characteristic.

7. A video camera comprising:
(a) image pickup means for photographically converting an optical image to form a plurality of color signals;
(b) generation means for generating color temperature information;
(c) white balance control means for controlling a white balance of the plurality of color signals according to the color temperature information, said white balance control means being able to be arranged to change a control characteristic between first and second control characteristics having different white balance control ranges;
(d) reverse means for selectively reversing the plurality of color signals; and
(e) interlocking means for interlocking said reverse means and a changing operation of the control characteristic of said white balance control means, wherein said white balance control means include gain control means for adjusting relative gains of the plurality of color signals, and wherein said white balance control means has first and second control tables for defining gain control ranges of the plurality of color signals, and selectively uses said first and second control tables to change the control characteristic and wherein said white balance control means forms control values according to the color temperature information, and when the control values are not present in the selected table, said white balance control means replaces the control values with values outside the selected table.

8. A video camera according to claim 1, wherein said interlocking means includes a switch, which can be manually operated, determines whether or not said interlocking means causes said reverse means to execute a reverse operation, and changes the control characteristic of said white balance control means according to an operation of said switch.

9. A video camera comprising:
(a) image pickup means for photoelectrically converting an optical image to form a plurality of color signals;
(b) changing means for changing an operation mode of said camera between a negative mode and a positive mode;
(c) generation means for generating color temperature information;
(d) white balance control means for controlling a white balance of the plurality of color signals according to the color temperature information, said white balance control means being able to be arranged to change a white balance control range between the negative mode and the positive mode; and
(e) reverse means for reversing the plurality of color signals in the negative mode.

10. A video camera according to claim 9, wherein said generation means includes an extraction circuit for extracting average levels of the plurality of color signals before the color signals are reversed by said reverse means.

11. A video camera, comprising:
(a) image pickup means for photographically converting an optical image to form a plurality of color signals;
(b) changing means for changing an operation mode of said camera between a negative mode and a positive mode;
(c) generation means for generating color temperature information;
(d) white balance control means for controlling a white balance of the plurality of color signals according to the color temperature information, said white balance control means being able to be arranged to change a white balance control range between the negative mode and the positive mode; and
(e) reverse means for reversing the plurality of color signals in the negative mode,
wherein said generation means includes an extraction circuit for extracting average level of the plurality of color signals before the color signals are reversed by said reverse means.

12. A video camera comprising:
(a) image pickup means for photoelectrically converting an optical image to form a plurality of color signals;
(b) changing means for changing an operation mode of said camera between a negative mode for reversing the plurality of color signals, and a positive mode for inhibiting the reverse operation of the color signals; and
(c) white balance control means for controlling a white balance of the plurality of color signals, said white balance control means being able to be arranged to change a white balance control range between the negative mode and the positive mode.

* * * * *